Sept. 20, 1971 K. CAMPBELL 3,605,820
LOOP PICKER FOR LOOMS AND METHOD OF FORMING SAME
Filed Nov. 26, 1969

INVENTOR
KYLE CAMPBELL
BY
Richards & Shefte
ATTORNEYS

United States Patent Office 3,605,820
Patented Sept. 20, 1971

3,605,820
LOOP PICKER FOR LOOMS AND METHOD OF
FORMING SAME
Kyle Campbell, Charlotte, N.C., assignor to The Terrell
Machine Company, Charlotte, N.C.
Filed Nov. 26, 1969, Ser. No. 880,211
Int. Cl. D03d 49/36
U.S. Cl. 139—159                    8 Claims

ABSTRACT OF THE DISCLOSURE

A loop picker for looms of the type formed by molding assembled layers of rubberized fabric during a vulcanizing cure is improved by interposing a layer of thermoplastic material (e.g., nylon fabric) in the rubberized fabric layers surrounding the picker stick hole or "loop" provided in the picker body and subjecting this interposed layer to the vulcanizing cure and molding along with the rubberized fabric layers. The resulting picker can have the loop thereof sized to fit a picker stick on which it is to be installed with a grip effective enough to eliminate any need for glue or screw fastening such as is commonly employed for maintaining pickers of this sort in place during use.

BACKGROUND OF THE INVENTION

A loop picker is mounted on a picker stick to throw and receive the impact of the shuttle during loom operation. A common form is built by assembling rubberized fabric layers to provide an uncured oversize blank of the general shape desired and then subjecting this blank to a vulcanizing cure under molding pressure to size the final picker body with the outward appearance of being solid. U.S. Pat. No. 2,032,734, for example, illustrates and describes the formation of such a picker.

In order to provide for picker stick mounting, the picker body is conventionally formed with a hole or loop that is sized for installation on the upper end of the picker stick, which is characteristically tapered. According to usual practice, the picker loop is undersized from front to back, in the order of $\frac{1}{16}''$, so that the picker body will encounter some resistance on the picker stick taper requiring it to be pressed into place and allowing it to be aligned readily at the shuttle level.

With picker bodies of this sort as heretofore available, however, the allowable undersizing of the loop for the foregoing purpose was not sufficient to hold the picker in place during use, so that application of glue between the picker and stick or insertion of a fastening screw was needed to complete the installation. In either event, as the picker will wear and must be replaced a number of times during the life of the stick, the matter of picker replacement was rendered difficult and often resulted in damaging the stick at its upper end taper to such an extent that it would have to be discarded before its useful life was spent.

Greater undersizing of the loop to combat such difficulties was not possible without fracturing the loop structure and destroying the picker until the present invention was conceived.

SUMMARY OF THE INVENTION

According to the present invention, an improved loop picker of the foregoing type is provided in which a layer of thermoplastic material is interposed in the rubberized fabric layers about the picker stick hole or loop and is subjected to the vulcanizing cure and molding along with the rubberized fabric.

The thermoplastic material used for the interposed layer must be sufficiently flexible for handling comparably with the rubberized fabric, and it must have a melting temperature above that employed for the vulcanizing cure. A nylon layer in fabric form is preferred, as will be noted further below, although a flexible film form can also be used and other thermoplastic materials can be employed, such as a terephthalic polyester or an acrylic. In building the picker with this interposed thermoplastic layer a substantially equal weight of the rubberized fabric layering, that would otherwise be used, is eliminated so that the normal bulk or volume of the picker structure is not essentially changed during formation or in finished form.

By the improvement obtained in this manner, a loop structure is provided that can be undersized to about twice the extent heretofore common (i.e., in the order of $\frac{1}{8}''$ from front to back of the loop) so as to grip the picker stick taper tenaciously enough upon installation to remain securely in place during use without fastening in any other way. This result is due in part, of course, to the increased strength or reinforcement of the loop structure imparted by the interposed layer of thermoplastic material, but a more important factor appears to be an added function of the thermoplastic layer in generating a surprisingly greater gripping force on the picker stick taper than would have been expected.

Apparently, this thermoplastic layer not only enhances the elastic strength of the loop structure, but also develops a contracting tendency in this structure as it is pressed into place on the picker stick taper that produces an exceptionally effective positioning grip. In any event, the result is to provide a loop picker that may be installed securely simply by being pressed into place and that may be removed just as readily by oppositely directed pressure, so as to be used at substantially improved advantage.

DESCRIPTION OF THE PREFERRED EMBODIMENT

Figure 1:
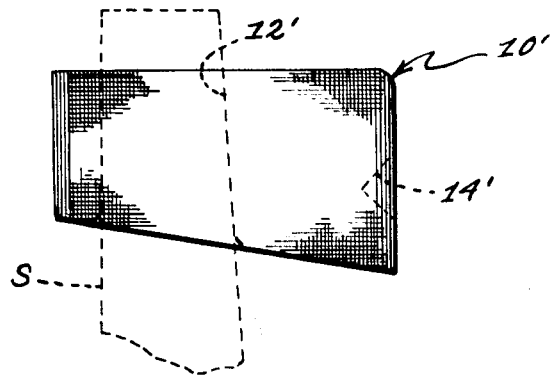
FIG. 1 is a side elevation of a loop picker embodying the present invention in place on a picker stick.
Figure 2:
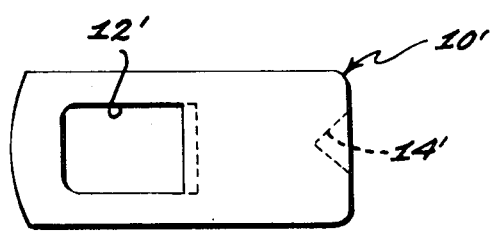
FIG. 2 is a top plan view of the FIG. 1 picker.
Figure 3:
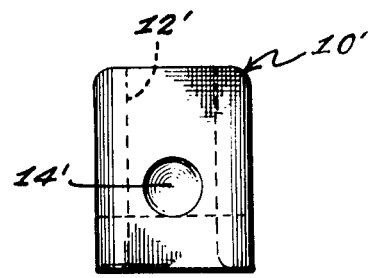
FIG. 3 is a right end view of the FIG. 1 picker.

A loop picker embodying the present invention is shown at 10' in FIG. 1 with its mounted operating disposition indicated in relation to a broken line representation of the upper end tapered portion of a picker stick S. FIGS. 2 and 3 additionally illustrate the form of hole 12' provided in the loop picker 10' for mounting on the stick S, and the front face recess 1' arranged to receive the nose of the shuttle (not shown) in relation to which the picker 10' acts during loom operation.

Figure 4:
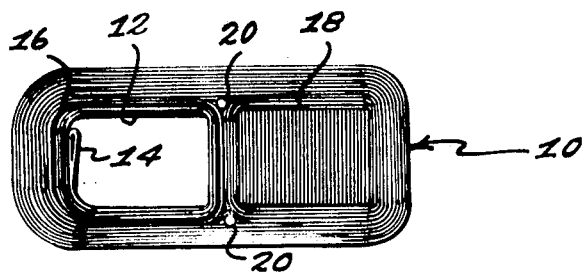
FIG. 4 is a top plan view of an uncured blank for the FIG. 1 picker.
Figure 5:
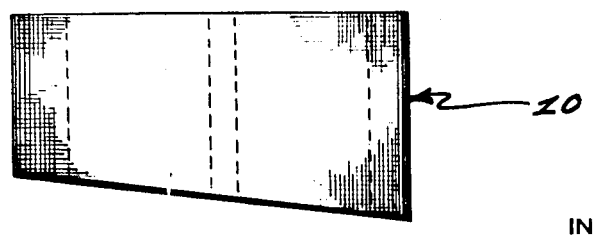
FIG. 5 is a side elevation corresponding to FIG. 4.

FIGS. 4 and 5, in turn, illustrate the type of blank 10 prepared for forming the picker 10'. In general, the blank preparation follows the procedure described in the previously noted U.S. Pat. No. 2,032,734, although in the present instance wrapping of the rubberized fabric starts at the back side of the loop 12 provided for forming the picker stick hole 12' in the finished picker 10'.

The rubberized fabric employed must contain some cotton in order to acquire a sufficient adhesive quality for forming a satisfactory blank, but a blend of the cotton with a synthetic fiber, such as nylon, is desirable for the greater picker structural strength that results. Fabrics based on a 75% nylon–25% cotton blend are thought to give a superior result from the standpoint of strength, although the blend ratio is commonly reversed when expense of the fabric is a controlling factor. The present invention allows a fabric of the less expensive blend to be used for the main portion of the picker body with results that are better than those heretofore obtained with the premium blend fabric.

Accordingly, 25% nylon–75% cotton fabric is suitably employed according to the present invention at a 38 x 38 count of 6½s warp and filling to provide a square yard weight of about 9.7 ounces. After rubber impregnation, a short length of the fabric is doubled back upon itself to form the starting edge (represented at 14 in FIG. 4) at which wrapping is commenced around a core bar (not shown) to form the loop 12. The wrapping is started at the back side of the loop 12, as previously noted, and as the second wrap is nearing completion the supplementary thermoplastic layer that characterizes the present invention is interposed to form a differential wrap as indicated at 16 in FIG. 4.

As noted earlier, this thermoplastic layer or wrap 16 is preferably provided in fabric form. Excellent results have been obtained with a nylon fabric constructed of 840/2 nylon 714 filament having a 12 x 12 twist and employed at a 22 x 22 count to yield a square yard weight of about 12.5 ounces. Interposition of the thermoplastic layer 16 is begun to extend across the back side of the loop 12 at the outset and is continued for a complete wrap and overlapping at this back side, so that the result is to interpose the layer 16 over two layers of the rubberized fabric surrounding the loop at 12 at which the picker stick hole 12' is to be formed. This overlapping of the interposed layer end portions at the back side of loop 12 results in building up the picker wall thickness in back of the picker stick hole 12', as is usually done by back-lapping rubberized fabric layering at this point and which can be dispensed with together with enough of the rubberized layering otherwise to maintain a substantially equal weight or bulk in the picker structure as previously mentioned.

After wrapping of the rubberized fabric is then continued to superimpose further layers at the loop structure, a face block portion 18 is disposed at the front side of the loop 12 for incorporation in the picker body. This face block portion 18 is provided to receive and bear directly the impact from shuttle contact during operation of the picker, and it is formed mainly of rubberized fabric strips laid up or stacked to build the block core which is wrapped with two layers of rubberized fabric to complete the block structure. Because the core strips are subjected to particularly severe shock and strain they are preferably formed of a rubberized fabric having a substantially higher nylon proportion in the blend, but the covering wraps may be of the same rubberized fabric used in the rest of the picker body.

Once the face block portion 18 has been formed and is in place, wrapping of the rubberized fabric used initially in forming the loop 12 is continued about the face block portion 18 as well to complete the body of the picker blank 10 to a suitable fullness for molding. However, before this continued wrapping is done it is desirable to place filler bead elements 20 at each base corner of the face block portion 18 to fill the voids that would otherwise be left at these points, as proposed in U.S. Pat. No. 2,032,734 noted earlier. A cotton cord of sufficient filler size forms satisfactory bead elements 20.

Building of the picker blanks 10 in the foregoing manner is done in a composite length extending perpendicular to the plane of FIG. 4 that corresponds to a standard fabric width (e.g., 60"), and the individual blanks 10 are cut from this composite length to a form such as is illustrated in FIG. 5, in which the vertical blank height will correspond essentially with that desired in the finished picker 10', while the outer transverse dimensions of the blank 10 will be somewhat oversize for molding to the finished size and shape of picker 10' during a vulcanizing cure.

For this finishing step, the cut blanks 10 are placed in individual mold cavities in which a core of picker stick shape is provided to form the tapered mounting hole 12', and a projection is arranged to form the shuttle nose recess 14'. The molding is done under pressure of about 100 p.s.i., at a temperature around 300° F., and is continued for approximately 18 minutes to effect the vulcanizing cure as the final picker shape is obtained.

The resulting loop picker 10' will mount on picker sticks S measuring ⅛" greater from front to back than the picker stick hole 12' without any adverse effect on the picker structure, and when so mounted will grip the picker stick firmly enough to maintain operating alignment simply from having been pressed into place. And, as the need for auxiliary fastening is thereby eliminated, the loop pickers 10' may also be pressed out of place for replacement just as readily as they are mounted, so that commonly resulting picker stick damage or marring during picker installation and removal is avoided.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

I claim:

1. In a loop picker for looms of the type formed by molding assembled layers of rubberized fabric during a vulcanizing cure and having a plurality of said rubberized fabric layers surrounding a picker stick hole therein, the improvement which comprises a layer of thermoplastic material interposed in said rubberized fabric layers and encircling said picker stick hole and subjected therewith to the vulcanizing cure and molding, said interposed thermoplastic material having a melting temperature above that employed for the vulcanizing cure.

2. In a loop picker, the improvement defined in claim 1 and further characterized in that said interposed thermoplastic material layer is provided in fabric form.

3. In a loop picker, the improvement defined in claim 2 and further characterized in that said interposed thermoplastic fabric replaces a substantially equal weight of said rubberized fabric.

4. In a loop picker, the improvement defined in claim 2 and further characterized in that said layer of thermoplastic fabric is interposed over two layers of said rubberized fabric about said picker stick hole.

5. In a loop picker, the improvement defined in claim 2 and further characterized in that said interposed layer of thermoplastic fabric extends about said picker stick hole sufficiently to overlap at the back side thereof.

6. In a loop picker, the improvement defined in claim 1 and further characterized in that said interposed thermoplastic material is nylon.

7. In the process of forming a loop picker for looms by molding assembled layers of rubber fabric during a vulcanizing cure to provide a loop picker body in which certain of said rubberized fabric layers surround a picker stick hole therein, the improvement which comprises interposing in said rubberized fabric layers to encircle said picker stick hole a layer of thermoplastic material having a melting temperature above that employed for the vulcanizing cure, and subjecting the interposed thermoplastic material layer to the vulcanizing cure and molding along with the rubberized fabric layers.

8. In the process of forming a loop picker for looms, the improvement defined in claim 7 and further characterized in that said interposed thermoplastic material is nylon.

References Cited

UNITED STATES PATENTS

| | | | |
|---|---|---|---|
| 2,032,734 | 3/1936 | Bacon | 139—159 |
| 2,325,187 | 7/1943 | Lewis | 139—159 |
| 2,549,394 | 4/1951 | Shivell et al. | 139—159 |
| 2,585,435 | 2/1952 | Chadbourne | 139—160 |
| 3,332,450 | 7/1967 | Bowling et al. | 139—159 |

FOREIGN PATENTS

| | | | |
|---|---|---|---|
| 708,122 | 4/1954 | Great Britain | 139—159 |

JAMES KEE CHI, Primary Examiner

PO-1050
(5/69)

UNITED STATES PATENT OFFICE
CERTIFICATE OF CORRECTION

Patent No. 3,605,820     Dated September 20, 1971

Inventor(s) Kyle Campbell

It is certified that error appears in the above-identified patent and that said Letters Patent are hereby corrected as shown below:

Column 2, line 60, "1'" should read -- 14' --. Column 3, line 16, insert -- a -- before "25%". Column 4, line 65, "rubber" should read -- rubberized --.

Signed and sealed this 2nd day of May 1972.

(SEAL)
Attest:

EDWARD M. FLETCHER, JR.
Attesting Officer

ROBERT GOTTSCHALK
Commissioner of Patents